J. F. PIERCE AND H. H. GORDON.
MANIFOLD HEATER FOR INTERNAL COMBUSTION ENGINES.
APPLICATION FILED JAN. 2, 1920.
Reissued Dec. 14, 1920. 15,008.
Fig. 1
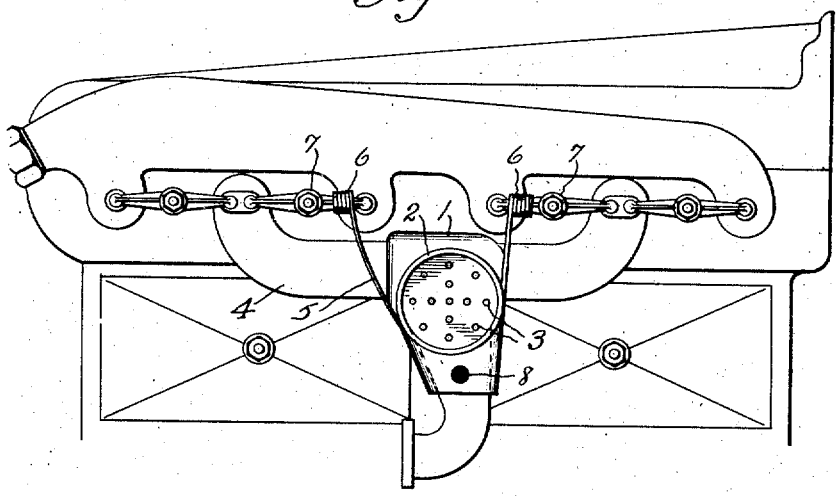
Fig. 2
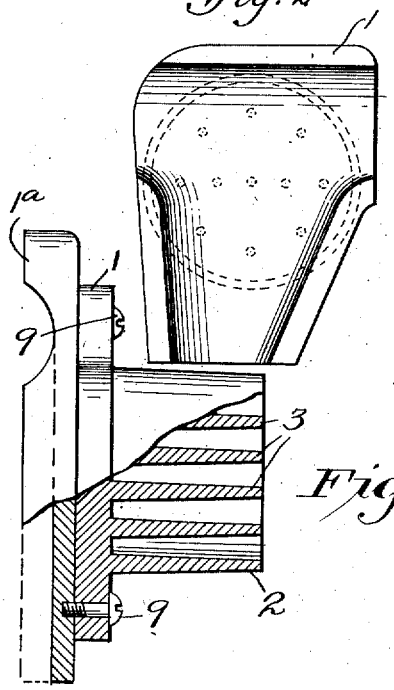
Fig. 3.
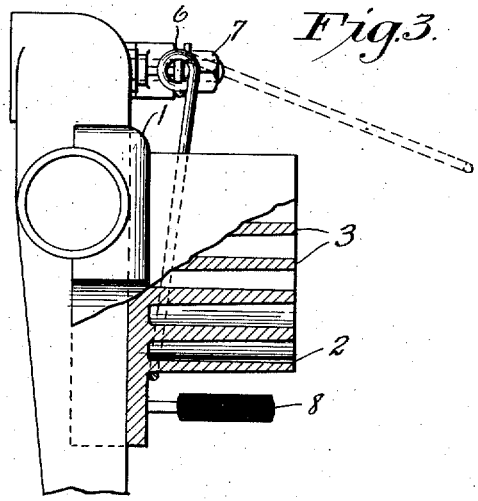
Fig. 4.
Inventor
James F. Pierce
By Haynes A. Gordon
Attorney

UNITED STATES PATENT OFFICE.

JAMES F. PIERCE AND HAYNER H. GORDON, OF WASHINGTON, DISTRICT OF COLUMBIA; SAID PIERCE ASSIGNOR TO CHARLES H. POTTER, OF WASHINGTON, DISTRICT OF COLUMBIA.

MANIFOLD-HEATER FOR INTERNAL-COMBUSTION ENGINES.

15,008. Specification of Reissued Letters Patent. Reissued Dec. 14, 1920.

Original No. 1,320,344, dated October 28, 1919, Serial No. 184,461, filed August 4, 1917. Application for reissue filed January 2, 1920. Serial No. 349,029.

*To all whom it may concern:*

Be it known that we, JAMES F. PIERCE and HAYNER H. GORDON, citizens of the United States, and residents of Washington, District of Columbia, have invented certain new and useful Improvements in Manifold-Heaters for Internal-Combustion Engines, of which the following is a specification, reference being had therein to the accompanying drawing.

The present invention relates to a device, the function of which is to facilitate the easy starting of internal combustion engines during cold weather, the same being adapted to supply heat to the intake manifold of the engine so as to cause vaporization of the fuel mixture contained therein.

In devices of this nature heretofore used, it has usually been necessary to either use a manifold of special construction, or else to remove the manifold from the motor in order to do suitable machine work upon the same to provide the necessary means for heating the mixture.

It is the general object of this invention to provide a simple heating device, comprising a structure adapted to be clamped against the exterior of the manifold by a simple clamping means for the purpose of supplying heat to the mixture contained therein.

Other objects of the invention will appear as the construction is more fully disclosed.

For the purpose of rendering the invention more clear, reference is had to the accompanying drawings in which—

Figure 1 shows a form of the invention as adapted for use in connection with the manifold of a Ford engine, Fig. 2 shows the bottom or under surface of the structure shown in Fig. 1, Fig. 3 shows a side elevation thereof partly in section, and Fig. 4 shows a modification.

The device as shown in Fig. 1 consists of a casting 1 on the face of which is mounted a cup 2 containing a series of heating elements or spines 3. The bottom or under surface of the casting is grooved or hollowed out as shown in Fig. 2 so that this surface will conform with the surface of the inlet manifold. The casting 1 is normally held in this position against the inlet manifold 4 by means of the spring loop 5 the ends of which are formed in the coils 6 and fastened under the nuts 7. While this type of resilient clamping means is shown in connection with the manifold heater, it is evident that other forms of clamps, or holding means could be used without departing from the spirit of the invention herein set forth.

An insulated handle 8 may be provided to lift the manifold heater and place the same in position after it has become heated, but this may be dispensed with if desired, as the same may be placed in position by the gloved hand of the operator.

The operation of the device is as follows: When it is desired to use the manifold heater, the same is removed from its normal position on the inlet manifold 4, by swinging the spring loop 5 into the position shown in dotted lines in Fig. 3. The casting 1 is then placed upon any flat surface and a small quantity of gasolene is poured into the cup 2, and ignited. The heat of combustion of the gasolene is readily communicated to the casting 1 by means of the spines 3, and when the gasolene is burned out the heater is lifted by means of the insulated handle 8, or the gloved hand of the operator and placed in position upon the inlet manifold 4. As the bottom surface of the casting 1 is in conformity with the exterior surface of the inlet manifold 4, and the spring 5 tends to hold these surfaces in contact, the heat contained in the casting 1 is readily given up to the inlet manifold, with the result that the mixture passing therethrough is readily vaporized, and the engine is therefore easily started. While the manifold heater as herein disclosed is shown in connection with a Ford engine, it should be understood that the same is applicable to any type of internal combustion engine motor, it only being necessary to so shape the bottom surface of the casting 1 so that it may conform with a portion of the surface of the inlet manifold.

It should be noted that the interior surface of the cup 2 tapers toward the bottom thereof, so that it is impossible for any gasolene to remain in or be placed in the cup while the heater is in position on the manifold thereby rendering the device fool proof.

In the modification shown in Fig. 4, the heating element consists of a base plate 1ª, grooved or hollowed out as previously described to conform to the surface of the inlet manifold. Mounted upon the flat surface of the heating element 1ª, by means of the screws or bolts 9, 9, is the integral casting 1 carrying the cup 2 and spines 3. With the manifold heater constructed as shown in this modification it is also capable of use as a vulcanizer, as the bolts or screws, 9, 9 may be loosened sufficiently to allow a tube and patch to be inserted between the elements 1 and 1ª, the screws 9, 9 being again tightened, the device being then placed on a table or other flat surface, the necessary quantity of combustible fluid placed in the cup 2 and the process of vulcanization carried out. It should be noted in this respect that when the structure is used as a vulcanizer, the grooved portions of the base plate 1ª permit a circulation of air to take place, thereby assisting in keeping cool the lower portion of the tube undergoing vulcanization.

The particular form of our invention herein disclosed is, of course, susceptible to considerable variation without departing from the spirit thereof, and it is to be understood that many changes might be made by those skilled in the art within the scope of the invention as defined in the appended claims.

What we claim is:

1. In an inlet manifold heater for internal combustion engines, the combination with a heat-retaining and transferring element, means for holding the same in contact with the manifold, said element being adapted to be heated when disengaged from the manifold.

2. In an inlet manifold heater for internal combustion engines, the combination with a heat-retaining and transferring element, of clamping means to hold the same in contact with the manifold, said element being adapted to be heated when disengaged from the manifold and said clamping means.

3. In an inlet manifold heater for internal combustion engines, the combination with a heating element, of clamping means to hold the same in contact with the inlet manifold of an internal combustion engine, the bottom surface of said heating element being shaped so as to conform with a portion of the exterior surface of the inlet manifold, said heating element having the upper surface thereof formed into a cup adapted to hold a combustible when said element is disengaged from the manifold.

4. In an inlet manifold heater for internal combustion engines, the combination with a heating element, of clamping means to hold the same in contact with the inlet manifold of an internal combustion engine, the bottom surface of said heating element being shaped so as to conform with a portion of the exterior surface of the inlet manifold, said heating element having the upper surface thereof formed into a cup adapted to hold a combustible fluid when said element is disengaged from the manifold, and heat conducting members located within said cup.

5. In an inlet manifold heater for internal combustion engines, the combination with a heating element, of clamping means to hold the same in contact with the inlet manifold of an internal combustion engine, the bottom surface of said heating element being shaped so as to conform with a portion of the exterior surface of the inlet manifold, and a cup carried by the upper surface of the heating element adapted to hold a combustible to impart heat to said heating element when detached from the manifold.

6. In an inlet manifold heater for internal combustion engines, the combination with a heating element, of clamping means to hold the same in contact with the manifold, said element adapted to be heated prior to engagement with the manifold.

7. In an inlet manifold heater for internal combustion engines, the combination with a heating element, of clamping means to hold the same in contact with the inlet manifold of an internal combustion engine, a cup carried by the upper surface of the heating element and adapted to hold a combustible fluid to impart heat to said heating element, the sides of said cup being so tapered that no combustible fluid can be placed in or remain in said cup when the heating element is in contact position with said inlet manifold.

8. In an internal combustion engine, the combination with a cylinder block of an inlet manifold, bolts projecting from said cylinder block, manifold brackets mounted upon said bolts to hold said manifold in engagement with said cylinder block, a heating element for said inlet manifold, and clamping means carried by said bolts and adapted to hold said heating element in resilient contact with said inlet manifold.

9. In combination a heat transferring element for use with the inlet manifold of an internal combustion engine, said element adapted to be heated when detached from the manifold and clamping means to position the element when heated and hold the same in contact with said manifold.

10. In a heater for inlet manifolds of gas engines, a base plate with angularly disposed supporting flanges, a heating cup for the reception of combustible material and means for fastening the cup upon the base.

11. A heater of the class described, comprising a block having communicating longitudinal and transverse grooves, both of which are open at one side of the block.

12. A heater of the class described, comprising a block having communicating longitudinal and transverse grooves.

13. A heater of the class described, comprising in combination an element adapted to fit the longitudinal and transverse branches of an inlet manifold, and means for attaching the same to an inlet manifold.

14. In an internal combustion engine, the combination with a cylinder block of an inlet manifold, bolts projecting from said cylinder block, manifold brackets mounted upon said bolts to hold said manifold in engagement with said cylinder block, a heater for said inlet manifold and clamping means comprising nuts carried by said bolts and adapted to hold said heater in contact with said inlet manifold.

15. In an internal combustion engine, the combination with a cylinder block of an inlet manifold, bolts projecting from said cylinder block, a heater for said inlet manifold, nuts carried by said bolts, and means mounted on said bolts and held in place by said nuts for attaching said inlet manifold to the cylinder block and said heater to said inlet manifold.

JAMES F. PIERCE.
HAYNER H. GORDON.